(12) United States Patent
Heath (10) Patent No.: US 9,321,281 B2
(45) Date of Patent: Apr. 26, 2016

(54) SELECTIVE INK CURE

(75) Inventor: Peter Heath, Alexandria, NH (US)

(73) Assignee: Electronics for Imaging, Inc., Fremont, CA (US)

( * ) Notice: Subject to any disclaimer, the term of this patent is extended or adjusted under 35 U.S.C. 154(b) by 987 days.

(21) Appl. No.: 12/413,450

(22) Filed: Mar. 27, 2009

(65) Prior Publication Data

US 2010/0247795 A1    Sep. 30, 2010

(51) Int. Cl.
*B41J 2/01*        (2006.01)
*B41J 11/00*       (2006.01)
*C09D 11/101*      (2014.01)

(52) U.S. Cl.
CPC ............. *B41J 11/002* (2013.01); *C09D 11/101* (2013.01)

(58) Field of Classification Search
None
See application file for complete search history.

(56) References Cited

U.S. PATENT DOCUMENTS

| | | | |
|---|---|---|---|
| 5,502,464 A * | 3/1996 | Takahashi et al. | 346/25 |
| 5,678,133 A * | 10/1997 | Siegel | 399/67 |
| 5,751,432 A * | 5/1998 | Gwaltney | 358/296 |
| 6,031,529 A * | 2/2000 | Migos et al. | 715/783 |
| 6,496,190 B1 * | 12/2002 | Driemeyer et al. | 345/619 |
| 6,561,643 B1 * | 5/2003 | Walker et al. | 347/105 |
| 6,786,589 B2 | 9/2004 | Suzuki et al. | |
| 6,819,886 B2 * | 11/2004 | Runkowske et al. | 399/38 |
| 7,152,969 B2 * | 12/2006 | Hintermann | 347/102 |
| 7,173,617 B2 * | 2/2007 | Driemeyer et al. | 345/426 |
| 7,548,238 B2 * | 6/2009 | Berteig et al. | 345/426 |
| 7,690,782 B2 * | 4/2010 | Odell | 347/102 |
| 2002/0180819 A1 * | 12/2002 | Faken | 347/15 |
| 2003/0001844 A1 * | 1/2003 | Driemeyer et al. | 345/426 |
| 2004/0119772 A1 * | 6/2004 | Hoshino et al. | 347/19 |
| 2004/0166249 A1 * | 8/2004 | Siegel | 427/558 |
| 2004/0169650 A1 * | 9/2004 | Bastos et al. | 345/426 |
| 2005/0081161 A1 * | 4/2005 | MacInnes et al. | 715/765 |
| 2005/0104946 A1 * | 5/2005 | Siegel | 347/102 |
| 2005/0105048 A1 * | 5/2005 | Warden et al. | 351/177 |
| 2005/0168509 A1 * | 8/2005 | Yokoyama | 347/17 |
| 2006/0007290 A1 * | 1/2006 | Oshima et al. | 347/102 |
| 2006/0050122 A1 * | 3/2006 | Nakano et al. | 347/102 |
| 2006/0115147 A1 * | 6/2006 | Nishikawa | 382/164 |
| 2006/0119686 A1 | 6/2006 | Odell | |
| 2006/0290760 A1 | 12/2006 | German et al. | |
| 2007/0018980 A1 * | 1/2007 | Berteig et al. | 345/426 |
| 2007/0105034 A1 * | 5/2007 | Chatow et al. | 430/114 |
| 2007/0109382 A1 * | 5/2007 | Lafleche et al. | 347/102 |
| 2007/0139504 A1 | 6/2007 | Siegel | |
| 2007/0265906 A1 * | 11/2007 | Neal | 705/10 |
| 2007/0273739 A1 * | 11/2007 | Rodin et al. | 347/102 |
| 2008/0088689 A1 | 4/2008 | Korem | |
| 2008/0151029 A1 * | 6/2008 | Yokoyama | 347/102 |

(Continued)

OTHER PUBLICATIONS

Adobe Photoshop Elements 6 User Guide, copyright 2008, pertinent paged cited in action.*

(Continued)

*Primary Examiner* — Kristal Feggins
(74) *Attorney, Agent, or Firm* — Michael A. Glenn; Perkins Coie LLP (57) ABSTRACT

Individually controllable ultraviolet (UV) light-emitting diodes (LEDs) are used to cure ink and generate different effects. The UV LEDs only expose specified areas to generate the different effect and can create multiple effects on the same substrate by exposing different areas to varying amounts of time or by performing a curing stage and post-dosage curing stages. The different effects include generating a glossy surface, a matte surface, and sharper images.

14 Claims, 6 Drawing Sheets

(56) References Cited

U.S. PATENT DOCUMENTS

2009/0225143 A1* 9/2009 Fukui .............................. 347/102
2010/0033545 A1   2/2010 Caiger et al.
2010/0141653 A1* 6/2010 Lee et al. ....................... 345/426
2010/0236089 A1* 9/2010 Kawasaki et al. ................ 34/275
2011/0001782 A1* 1/2011 Jang et al. ..................... 347/102

OTHER PUBLICATIONS

International Search Report and Written Opinion for parallel PCT application No. PCT/US10/27858 filed Mar. 18, 2010, ISR mailed May 14, 2010, 8 pages.

* cited by examiner

SELECTIVE INK CURE

BACKGROUND OF THE INVENTION

1. Technical Field

This invention relates generally to the field of selective ink curing. More specifically, this invention relates to creating different curing effects on the same print through the use of ultraviolet light-emitting diodes.

2. Description of the Related Art

Figure 1A:
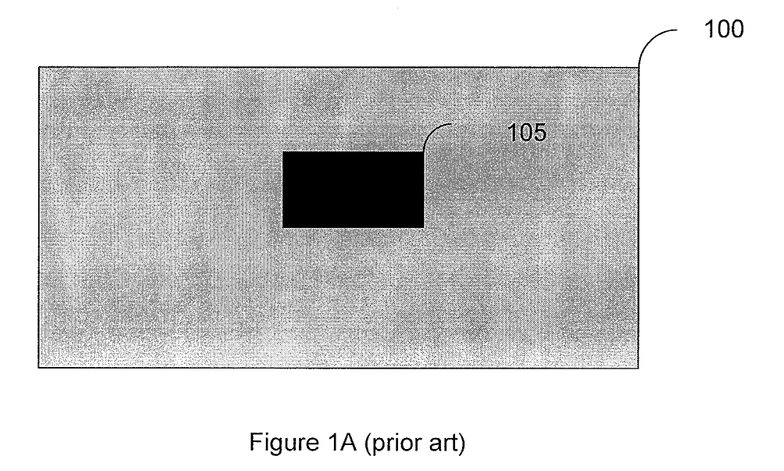
FIG. 1A shows a prior art example of a matte surface for printing an object.

Digital inkjet printers are used to generate different effects on substrates, such as a glossy surface or highlighting. One way to generate these effects is by using different substrates, such as paper coated with a glossy substance. These substrates, however, cause the entire substrate to show the effect and are more expensive than traditional substrates. FIG. 1A (prior art) is an example of using a matte substrate 100 as a background for printing an object 105. Because the matte substrate 100 applies to the entire background, it cannot be used to highlight specific areas of the substrate, such as text.

As a result of the problems associated with substrates, using a curable inkjet ink to produce the effect is more cost effective and preferable because the effect can be isolated to specific locations. These effects can be produced during ink curing or after the ink has hardened. The ink is typically cured by exposing ink that contains a photoinitiator to ultraviolet (UV) light.

Curable inkjet inks are particularly popular for grand or super-wide format printing systems, which are adapted for billboards, museum displays, billboards, sails, etc. because UV cured inks remain durable on a variety of substrate media.

Printers typically perform UV curing with various light sources, for example, mercury vapor lamps or metal halide bulbs. The problem with these types of various light sources, however, is that they require several minutes after activation to stabilize, they produce excessive heat during curing, ozone is a byproduct of their use, and the light sources have a limited shelf-life.

Another technique for UV curing involves the use of light emitting diodes (LED) that emit UV radiation. UV LEDs are ready to perform curing as soon as they are activated, they require less energy than UV bulbs, and they produce less heat because the LED can be designed to emit a narrow range of wavelengths. U.S. Pat. No. 6,786,589 discloses an ink jet printer in which multiple UV light sources use LEDs to harden the ink drops. U.S. Publication Number 2004/0166249 discloses the use of UV-LED chip arrays to cure inks, where each row in an array can emit a different wavelength of light, but each LED in a row is activated at the same time. In US2006/0119686, each printhead ejector corresponds to one UV-LED and each ink droplet is exposed to the UV-LED exactly once.

Figure 1B:
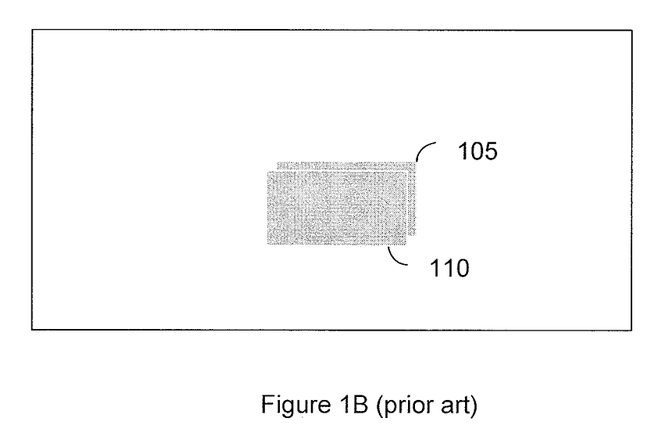
FIG. 1B is a prior art example of using UV LEDs to generate a matte effect.

FIG. 1B (prior art) illustrates the results of using the UV-LEDs, as taught in these references, to create a matte surface next to an object. Because the UV LEDs are always activated together, the matte is created in all places where a UV curing ink is deposited. Thus, in this example the matte 110 and the object 105 create a matte surface because both inks contain photoinitiators and the entire surface is exposed to the UV-LEDs.

Printers are configured to generate different curing effects using UV ink on a single print by adjusting the UV lamp output to vary the ink curing and surface characteristics. For example, reducing the initial dosage of UV output generates a glossy effect. Increasing the dosage creates a more matte surface. The area can be manipulated by curing once to set the ink and followed with post-dosages to generate different effects.

SUMMARY OF THE INVENTION

Individually controllable UV LEDs are used to cure inks on demand to generate different patterns. In one embodiment, the inks are cured once to set the ink. In another embodiment, post-dosage curing of the inks generates a different effect.

The array of print head nozzles lay down ink in a specified pattern. A lamp module contains UV LEDs that cure the ink. In one embodiment, the one printing assembly contains both the print head nozzles and LEDs. In another embodiment, one printing assembly dispenses the ink and another printing assembly cures the ink.

In one embodiment, the LEDs are configured in a binary mode, i.e. either on or off. In another embodiment, the LEDs are configured on a grayscale and, therefore, cure at different levels of intensity.

DETAILED DESCRIPTION OF THE INVENTION

The invention comprises a printing assembly and method for generating different printing effects by manipulating the UV curable ink with individually controllable UV LEDs. In one embodiment, the ink is exposed to the UV LEDs once to set the ink. In another embodiment, the ink is exposed to the UV LEDs after the ink has set to generate post-dosage effects.

In a typical printing assembly, an array of print head nozzles ejects UV curable ink onto a substrate. The print head nozzles are controlled by a data file containing instructions to lay the ink down in a specified pattern. In one embodiment, the print head nozzles dispense ink using thermal inkjet cartridges. In a thermal inkjet cartridge, a current runs through heating elements, which causes the ink to form a bubble until it bursts and is sprayed on a substrate. In another embodiment, the print heads include piezoelectric inkjets. Piezoelectric inkjets comprise crystals that vibrate in response to an electric charge. The crystals apply pressure to the ink reservoir within the print head and force ink through nozzles positioned on the underside of the print head.

At this stage the ink is wet and can move around on the substrate, especially if a low viscosity ink is used. Thus, the ink is exposed to UV light, which sets the ink. In one embodiment, a single printing assembly performs both the printing and the setting of the ink. In another embodiment, separate assemblies are used to perform each step.

Printing Assembly

Figure 2:
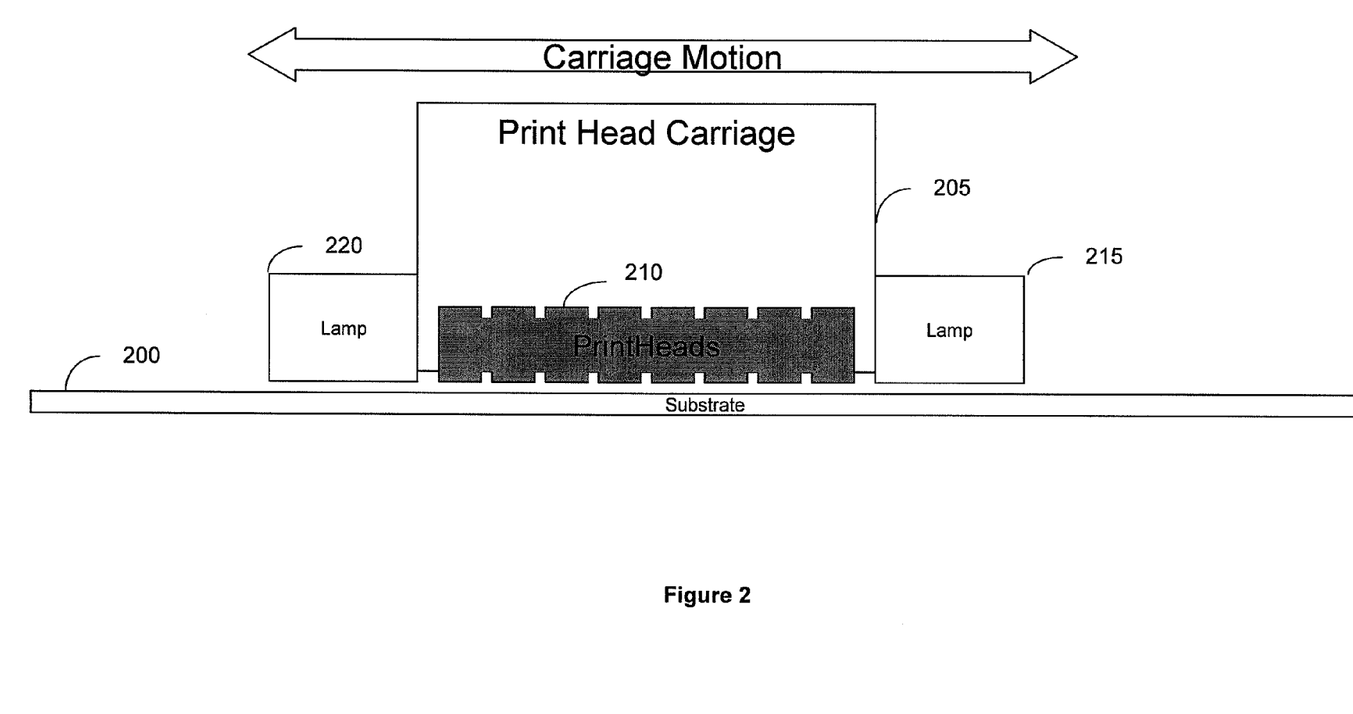
FIG. 2 shows a diagram of the configuration of the printing system according to one embodiment of the invention.

FIG. 2 is an example of a printing assembly according to one embodiment of the invention. The substrate 200 is positioned below the print head carriage 205. The print head carriage 205 includes any number of print heads 210 that are needed to deposit ink. The print heads 210 include inkjet nozzles (not shown), which are spaced apart along the y-axis of the print heads 210.

The resolution of each print head 210 is typically specified in dots per unit length. In one embodiment, the print heads 210 are native 100 dots per inch (dpi) and the carriage total generates a resolution of 540×600 dpi. In one embodiment, the print heads 210 contain only black ink. In another embodiment, the print heads 210 contain colored ink as well. The print head carriage 205 scans across the width of a substrate 200 as the substrate 200 advances beneath the print heads 210, which eject ink droplets until the ink is properly deposited.

The lamp 215 220 comprise UV LEDs. In one embodiment, the UV LEDs correspond to the number of print heads. In another embodiment, there are fewer UV LEDs than print heads. Once the ink heads 210 complete the step of ink deposition, the first lamp 215 cures the ink by moving over the substrate 200 until in position, and then exposing the ink to UV light. The first lamp 215 can either cure the ink completely or, if the user wants to generate a second effect, can partly cured, i.e. set the ink. The wavelength and time of exposure depend upon the ink properties, e.g. the mixing ratio of the pigment and the sensitivity of the ink and the effect desired by a user. In one embodiment, the intensity ranges from several hundred milliJoules (mJ) to several hundred thousand mJ.

If the first lamp 215 is smaller than the length and width of the substrate 200, the first lamp 215 moves to a different position and cures a new section of the substrate 200. The printer keeps track of the locations on the substrate that are exposed to UV curing to ensure that the exposure is uniform. Because the UV LEDs are individually controllable, there is no overlap of exposure.

If the user wants to generate effects after the ink has been set, the second lamp 220 is positioned over the substrate and exposes the ink to UV light complete the curing. In one embodiment, the first lamp 215 and the second lamp 220 emit UV light at different wavelengths. If the second lamp 220 is not long or wide enough to expose the entire substrate all at once, the second lamp 220 module is repositioned and exposes a different surface area. A person of ordinary skill in the art will recognize that the printing assembly can use the same lamp for both the initial curing and post dosage stages.

Figure 3:
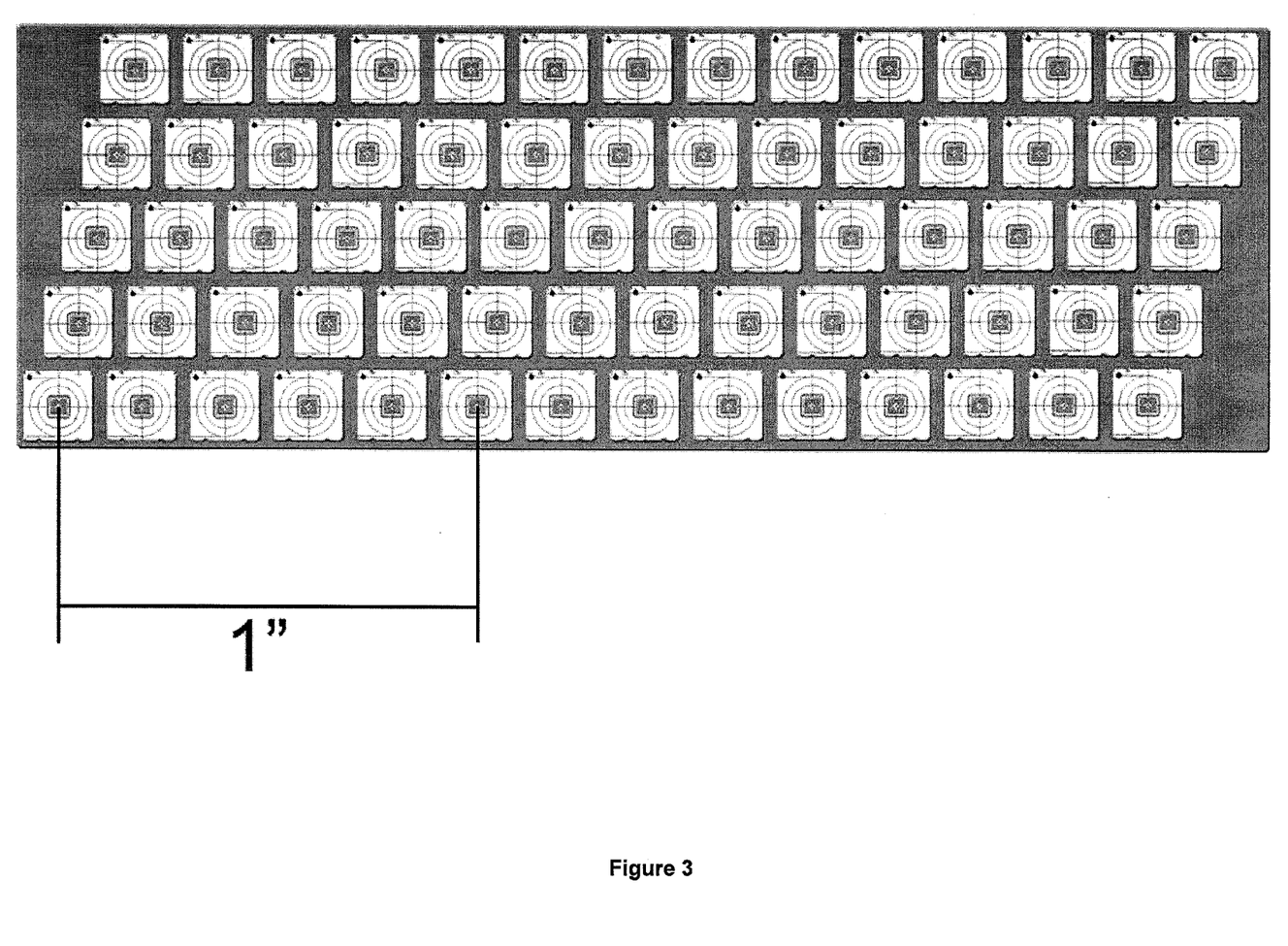
FIG. 3 shows a diagram of the UV LEDs used within the printing system according to one embodiment of the invention.

FIG. 3 shows an example of a UV LED array according to one embodiment of the invention. Although this UV LED array is illustrated as being a 25 dpi LED array, a person of ordinary skill in the art will recognize that a different sized array could easily be used. As smaller UV LEDs become available, the LEDs per inch will increase.

Figure 4:
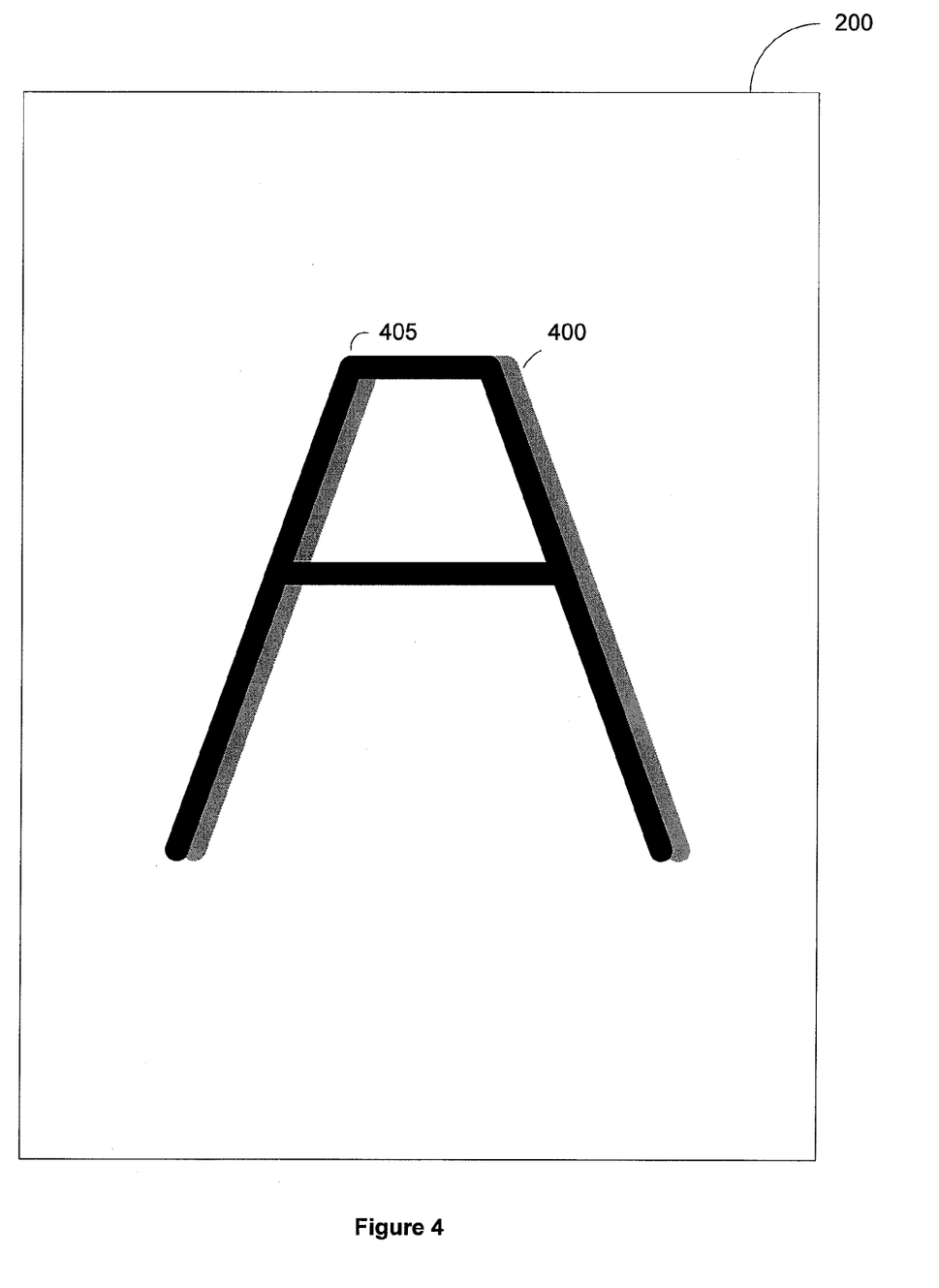
FIG. 4 shows an example of different effects produced using the UV LEDs according to one embodiment of the invention.

In addition to curing, the UV light is used to generate an ink effect. For example, a low dosage set cure produces a glossy surface. Increasing the dosage creates a more matte surface. Because the UV LEDs are individually controllable, different effects can be generated on the same substrate. FIG. 4 shows an example of generating multiple effects on the same substrate. A low dosage, i.e. intensity set cure is applied to an area 400 next to the logo 405 to generate a glossy effect. A high dosage set cure is then applied to the logo 405 to generate a sharp text effect. In addition, a higher dosage is applied to the background to develop a matte background.

In another embodiment, the UV LEDs expose very small areas within a pattern or logo to create a glossy effect. For example, curing selected parts of a logo with a low dosage set cure creates bits of gloss within the logo for an overall sparkling appearance.

In one embodiment, the UV LEDs are set to a binary mode, i.e. they emit light at the same intensity and are either on or off. In another embodiment, the UV LEDs are configurable to a grayscale of intensities to create different effects. An example of a grayscale setting on UV LED is setting one UV LED to glossy and progressively increasing the intensity until the last UV LED is set to matte. As a result, a section of the substrate can be treated to display a progression from glossy to matte.

Ink

The ink contains a photoinitiator, which is activated upon exposure to UV light to set the ink. In one embodiment, the photoinitiator comprises 0-20% of the ink composition by weight depending upon the ink color. In another embodiment, the photoinitator comprises 5-15% of the ink composition by weight depending upon the color.

In one embodiment, the inkjet inks are colored in common shades such as cyan, magenta, yellow, or black ("CMYK"). The colored inks can also include light cyan, light magenta, light yellow, light black, red, blue, green, orange, white, gray, spot colors, etc.

User Interface

Figure 5:
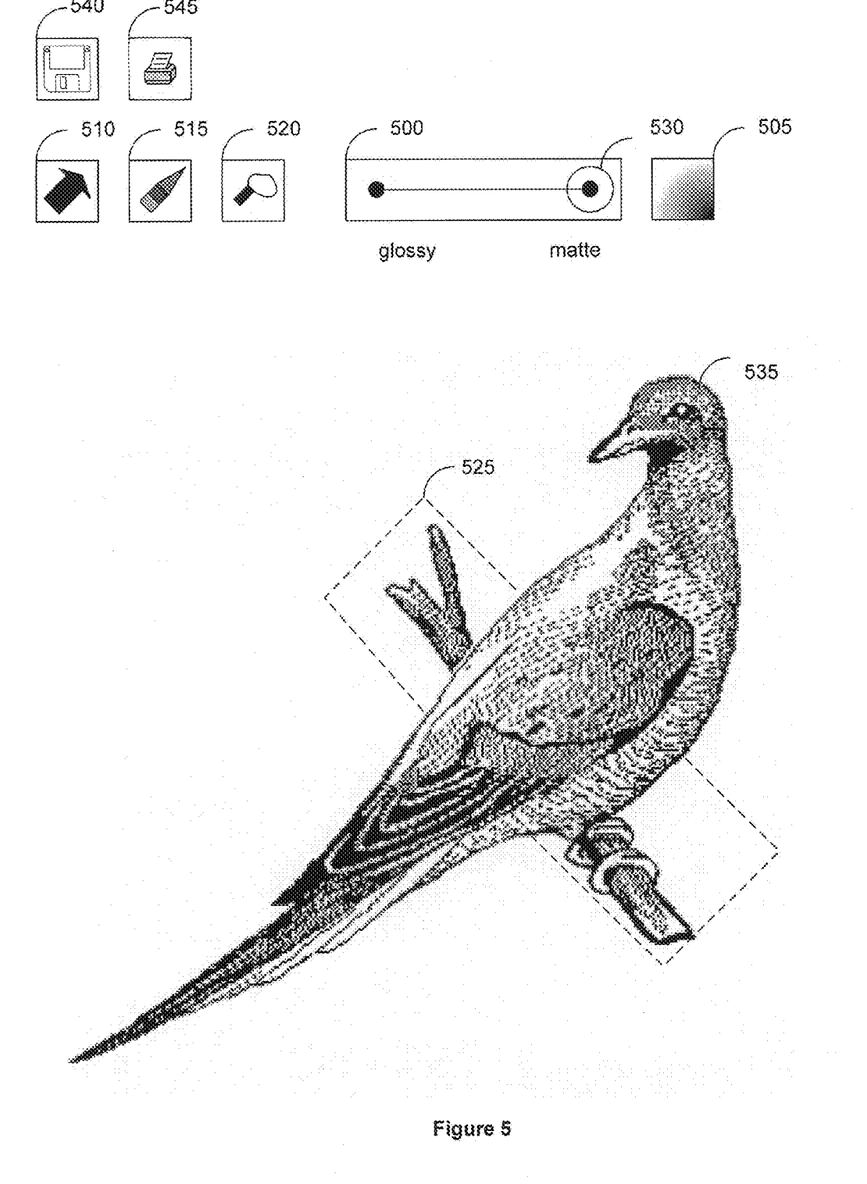
FIG. 5 shows an example of a software application that includes a user interface for allowing a user to specify different effects according to one embodiment of the invention.

FIG. 5 shows an example of a software application that includes a user interface for allowing a user to specify different effects according to one embodiment of the invention. A person of ordinary skill in the art will recognize that this is one example of a software application for specifying different effects and that different mechanisms for specifying effects require minor modifications in the software application.

The user interface comprises several icons for specifying the different effects. For example, a user specifies a specific effect using the slider 500, which progresses from glossy to matte. In one embodiment, the user can click on an object and then use the slider 500 to experiment with different gradients of glossy or matte. Alternatively, the user can click on the grayscale icon 505 to apply a grayscale to the selected object.

The user targets parts of the object using the arrow icon 510, the pencil icon 515, or the paintbrush icon 520. The arrow icon 510 is used to select an isolated part of the object. In this example, the user used the arrow icon 510 to select the branch 525 and moved the slider 500 to apply a matte to the branch 525 as indicated by the circle 530.

The pencil icon 515 allows a user to select very specific portions of the object for creating an effect. In this example, the user selects the pencil icon 515 to begin pencil mode, selects an effect from the slider 500, and clicks on sections of the pigeon's eye 535 to apply the effect. The pencil feature can also be used to make tiny markings within, for example, a logo to create a sparkly effect if the slider 500 is set to glossy. The paintbrush icon 520 allows for broader swathes of the effect. In this example, the user could use the paintbrush icon 520 to color the entire background.

Once the user is satisfied with the image, the user can save the data file by selecting the save icon 540. The software application generates instructions for correlating the sections of the image that are modified by the user with the individually controllable UV LEDs and for assigning an intensity and a time of exposure to each UV LEDs for any section of the substrate that is cured by the UV LEDs. Selecting the printer icon 545 transmits the request to print to the printer.

Steps for Using UV LEDs

Figure 6:
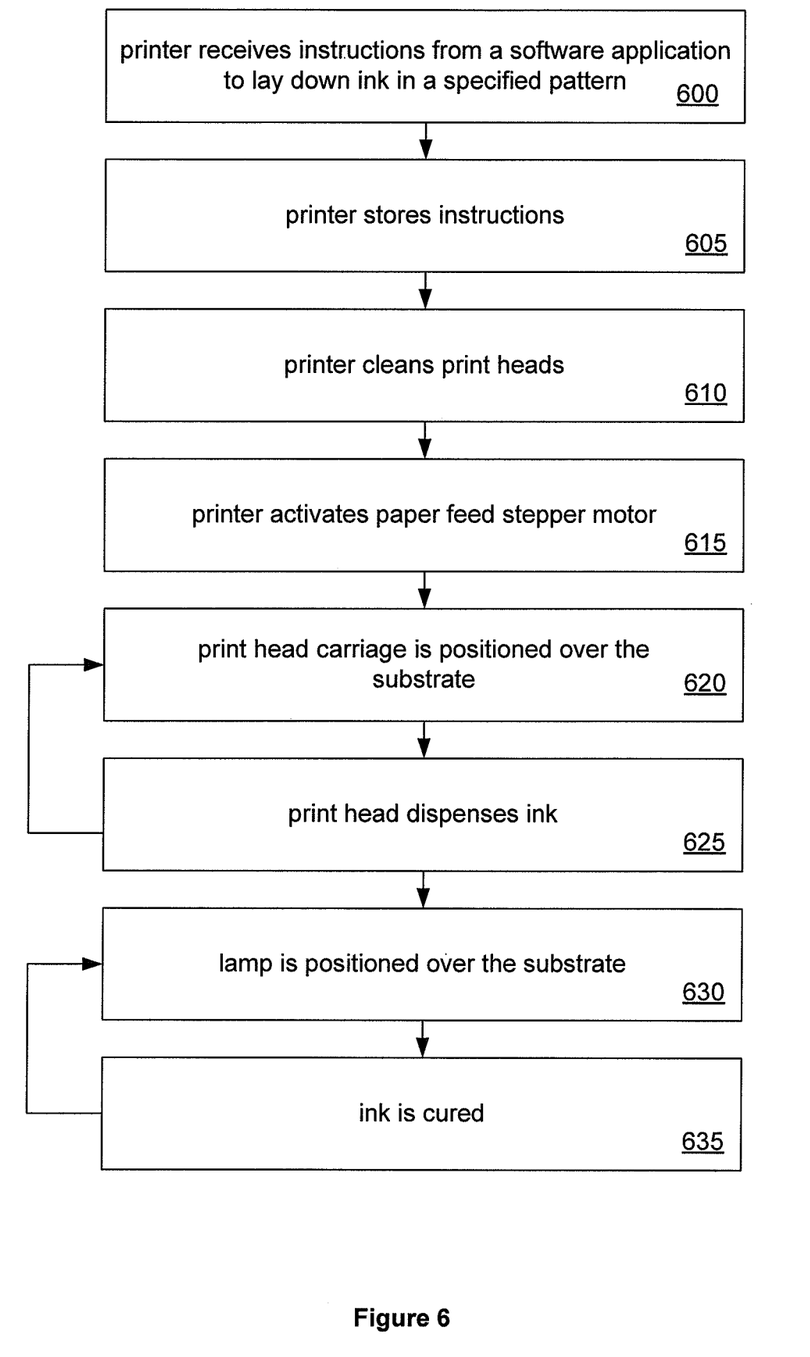
FIG. 6 is a flow diagram showing the steps for generating different effects using UV LEDs according to one embodiment of the invention.

FIG. 6 is a flow diagram that illustrates the steps for generating different effects using UV LEDs according to one embodiment of the invention. The printer receives 600 a data file that contains instructions from a software application to control the printer assembly to lay down ink in a specified pattern. The instructions are typically transmitted via a connection interface, e.g. parallel, universal serial bus (USB), etc. The printer stores 605 the instructions in a buffer. The buffer can be any form of computer-readable memory, e.g. random access memory (RAM). If the printer has been inactive for an extended period of time, the printer cleans 610 the print heads 210. The printer activates 615 the paper feed stepper motor, which engages the rollers, thereby feeding the substrate 200 from the paper tray into the printer. In one embodiment, the printer is configured to use grand or super-wide substrates 200. The substrate 200 is positioned on rollers or a conveyor assembly, e.g. a conveyor belt, which transports the substrate 200 inside the printer for printing.

The print head carriage 205 is positioned 620 over the substrate 200. The print head carriage 205 scans across the width of a substrate 200 while the print heads 210 dispense 625 ink. In one embodiment, the print heads 210 are individually controllable. The print heads 210 are again positioned 520 and again dispense 625 ink until the substrate 200 is covered. In one embodiment, the print head carriage 205 passes over the same area of the substrate 200 multiple times to generate a higher resolution.

The first lamp 215 module is positioned 630 over the substrate 200. The ink is cured 635 using a predefined intensity. Because the UV LEDs are individually controllable, different parts of the substrate 200 may be exposed to different intensities. The steps of positioning 630 and curing 635 are repeated until the ink is cured and the desired effects are generated.

The second lamp 220 is positioned 630 over the substrate 200. The ink is subjected to a post-curing 635 dosage using a predefined intensity. These steps are repeated until the post-curing is complete.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A printing system for selectively generating one or more print effects on one or more portions of an image on a substrate comprising:
    a mechanism configured to receive instructions from an application that includes a user interface, wherein the instructions identify
        one or more portions of the image less than the entire image that are directly selected by a user through the user interface, and
        a degree of glossiness for the directly selected one or more portions that are directly specified by the user through the user interface, wherein the degree of glossiness directly specified by the user corresponds to any level of gloss between no gloss and full gloss;
    a print head carriage including a plurality of print heads, each print head including at least one nozzle for dispensing inkjet ink onto the substrate to print the image based on the received instructions; and
    a lamp module associated with the print head carriage, wherein the lamp module includes a plurality of individually controllable ultraviolet (UV) light-emitting diodes (LEDs) for curing the printed image on the substrate, and to selectively expose the directly selected one or more portions of the image to different light intensities to achieve the degree of glossiness directly specified by the user for the directly selected one or more portions, based on the received instructions.

2. The printing system of claim 1, further comprising a second lamp module associated with the print head carriage for generating a post-dosage effect.

3. The printing system of claim 1, wherein the print heads generate at least 25 dots per inch.

4. The printing system of claim 1, wherein the print head resolution is 540×600 dots per inch.

5. The printing system of claim 1, wherein the UV LEDs are spaced to provide coverage of twenty-five UV LEDs per inch.

6. The printing system of claim 1, wherein the individually controllable UV LEDs emit UV light using a greyscale.

7. The printing system of claim 1, said each print head further comprising an ink reservoir.

8. The printing system of claim 1, wherein the inkjet ink comprises a photoinitiator that is between zero and twenty percent of ink composition by weight.

9. The printing system of claim 1, wherein the inkjet ink comprises a photoinitiator that is between 5 and 15 percent of ink composition by weight.

10. The printing system of claim 1, further comprising a conveyor belt for positioning a substrate below the print head carriage.

11. The printing system of claim 1, wherein the user interface includes a slider with a first endpoint representing a glossy effect, and a second endpoint representing a matte effect.

12. The printing system of claim 1, wherein a selected portion of the one or more portions of the image less than the entire image comprises any of a pattern or a logo, and wherein the UV LEDs are configured to cure one or more selected parts of the pattern or logo to create bits of gloss.

13. The printing system of claim 12, wherein the bits of gloss within the pattern or logo have a sparkling appearance.

14. The printing system of claim 12, wherein the user interface includes any of a pencil feature or a paintbrush icon for user selection of the selected portion.

* * * * *